(12) United States Patent
Rosander et al.

(10) Patent No.: US 9,981,584 B2
(45) Date of Patent: May 29, 2018

(54) METHOD OF REINFORCING A SEATBACK FRAME OF A SEAT ASSEMBLY

(71) Applicant: Toyota Motor Engineering & Manufacturing North America, Inc., Erlanger, KY (US)

(72) Inventors: Kyle E. Rosander, Ann Arbor, MI (US); Leon Toma, Commerce Township, MI (US); Christopher H. DeRose, Canton, MI (US); Robert Joseph Hazlewood, Plymouth, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 232 days.

(21) Appl. No.: 14/526,653

(22) Filed: Oct. 29, 2014

(65) Prior Publication Data

US 2016/0121771 A1    May 5, 2016

(51) Int. Cl.
| | |
|---|---|
| *B23K 31/00* | (2006.01) |
| *B23K 31/02* | (2006.01) |
| *B60N 2/68* | (2006.01) |
| *B23K 9/00* | (2006.01) |
| *B23K 9/173* | (2006.01) |
| *B23K 101/00* | (2006.01) |

(52) U.S. Cl.
CPC ............ *B60N 2/682* (2013.01); *B23K 9/0043* (2013.01); *B23K 9/173* (2013.01); *B23K 31/02* (2013.01); *B23K 2201/006* (2013.01)

(58) Field of Classification Search
CPC ........... B60N 2/682; B60N 2/72; B60N 2/289
USPC .............. 297/251, 253, 391, 452.18; 29/509
See application file for complete search history.

(56) References Cited

U.S. PATENT DOCUMENTS

| | | | |
|---|---|---|---|
| 2,576,806 A * | 11/1951 | Nowell | A47C 7/287 248/624 |
| 4,221,319 A | 9/1980 | Paice | |
| 4,965,431 A | 10/1990 | Monteleone | |
| 5,322,208 A | 6/1994 | Hinrichs et al. | |
| 5,492,581 A | 2/1996 | Searle | |
| 5,970,537 A * | 10/1999 | Hanes | A47C 17/22 5/12.1 |
| 7,665,163 B2 | 2/2010 | Polevoy et al. | |
| 7,721,406 B2 | 5/2010 | McCay | |
| 7,726,924 B2 | 6/2010 | Lu | |

(Continued)

FOREIGN PATENT DOCUMENTS

| | | |
|---|---|---|
| CN | 101311560 A | 11/2008 |
| JP | 2953354 B2 | 9/1999 |
| JP | 2001321953 A | 11/2001 |

*Primary Examiner* — Erin B Saad
(74) *Attorney, Agent, or Firm* — Dinsmore & Shohl LLP (57) ABSTRACT

A method of reinforcing a seatback frame of a seat assembly in which the seatback frame includes a pair of first frame members. The method includes the steps of providing a reinforcement member having an insertion end and an arm at an opposite end of the reinforcement member. The arm extends generally normal to the remainder of the reinforcement member to define a generally L-shape. An aperture is formed in one of the pair of first frame members. The insertion end of the reinforcement member is inserted into the aperture. The attachment end is aligned with the other of the pair of first frame members. The reinforcement member is welded to the seatback frame to reinforce the seatback frame.

18 Claims, 6 Drawing Sheets

(56) References Cited

U.S. PATENT DOCUMENTS

| | | | |
|---|---|---|---|
| 2004/0080194 A1* | 4/2004 | Medvecky | B60N 2/2887 297/253 |
| 2012/0222216 A1* | 9/2012 | Jin | A47C 19/122 5/400 |
| 2014/0183918 A1* | 7/2014 | Kaku | B60N 2/002 297/344.15 |

* cited by examiner

METHOD OF REINFORCING A SEATBACK FRAME OF A SEAT ASSEMBLY

FIELD OF THE INVENTION

The present invention is directed to a method of reinforcing a frame of a seat assembly. More particularly, a method in which an insertion end of a reinforcement member is inserted into an aperture formed in a frame member. The insertion allows for a linear alignment of the reinforcement member which allows for the accommodation of part tolerances while maintaining a contact between the reinforcement member and the seat frame.

BACKGROUND OF THE INVENTION

Figure 7:
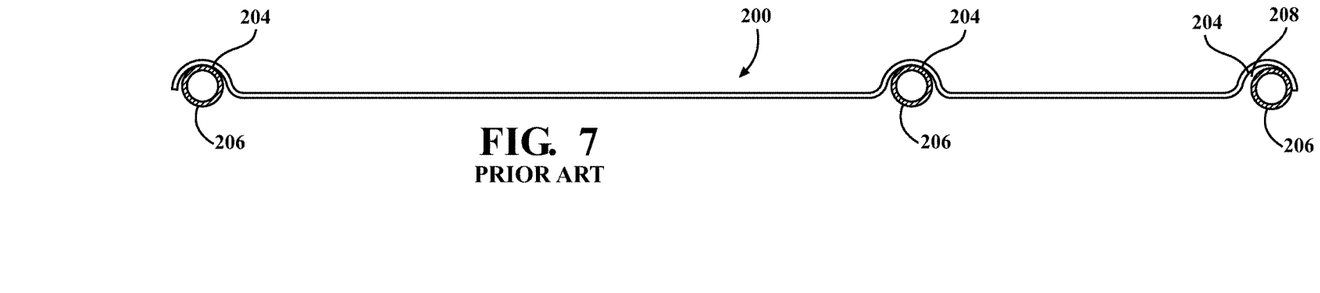
FIG. 7 is a cross-sectional view of a previously known seatback having a reinforcement.

It is well known in the art to provide reinforcements to seatback frames of seat assemblies by welding to the frame support structure. In order to increase efficiency and assembly costs, the reinforcements are robotically welded to the frame. Such reinforcements include concave portions that correspond to the shape of the frame as illustrated in FIG. 7.

The previously known reinforcements 200 are formed of a linear member 202 having a plurality of concave portions 204 that correspond to the frame 206. However, the reinforcement 200 does not allow for any variance in part tolerances. Specifically, any deviation from the specific dimensions of either the reinforcement 200 or the frame 206 results in an unacceptable robotic weld due to the formation of a gap 208. Further, the linearly adjustment of one end of the reinforcement 200 misaligns the opposite end. As such, the reinforcement 200 cannot be aligned while maintaining a proper contact of the opposite end of the reinforcement 200 and the frame 206. As such, an additional step of manually manipulating the reinforcement 200 to proper aligned to eliminate the gap 208, such as by bending or other shaping of the reinforcement 200, must be undertaken prior to the rewelding the reinforcement 200 to the frame 206.

Thus, there exists a need in the art to provide a method of reinforcing a seatback frame of a seat assembly over previous reinforcement structures and methods. Specifically, a reinforcing structure and method of reinforcement that provides linear adjustability to accommodate part tolerances such that contact is maintained while the reinforcement is aligned.

SUMMARY OF THE INVENTION

The following provides an improved method of reinforcing a seatback frame of a seatback assembly. The improved method overcomes the above-mentioned disadvantages of the previously known reinforcement techniques which lack adjustability to accommodate differences in part tolerances.

In brief, the method of reinforcing a seatback frame of a seat assembly in which the seatback frame includes a pair of first frame members. The method includes the steps of providing a reinforcement member having an insertion end and an arm at an opposite end of the reinforcement member. The arm extends generally normal to a remainder of the reinforcement member to define a generally L-shape. An aperture is formed in one of the pair of first frame members. The insertion end of the reinforcement member is inserted into the aperture. The attachment end is aligned with the other of the pair of first frame members. The reinforcement member is welded to the seatback frame to reinforce the seatback frame.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

A method of reinforcing a seatback frame of a seatback assembly that is able to accommodate part tolerances such that contact between one end of the reinforcement member is maintained during alignment, including the linear displacement, of the other end of the reinforcement member. The method includes inserting an insertion end of a reinforcement member into an aperture in a seatback frame prior to the alignment of an opposite end of the reinforcement member. The opposite end of the reinforcement member that extends generally normal to a remainder of the reinforcement member. A longitudinal axis of the arm is then aligned parallel to a longitudinal axis of the frame member.

The engagement of the insertion end and the aperture allows the reinforcement member to be linearly displaced while maintaining a contact between the insertion end and the aperture formed in the frame member. As such, even if one or more of the reinforcement member or the seat frame has a deviation in specified dimensions, the method allows for the reinforcement member to be properly aligned and secured without need for subsequent manual reworkings of any robotic welds.

Figure 1:
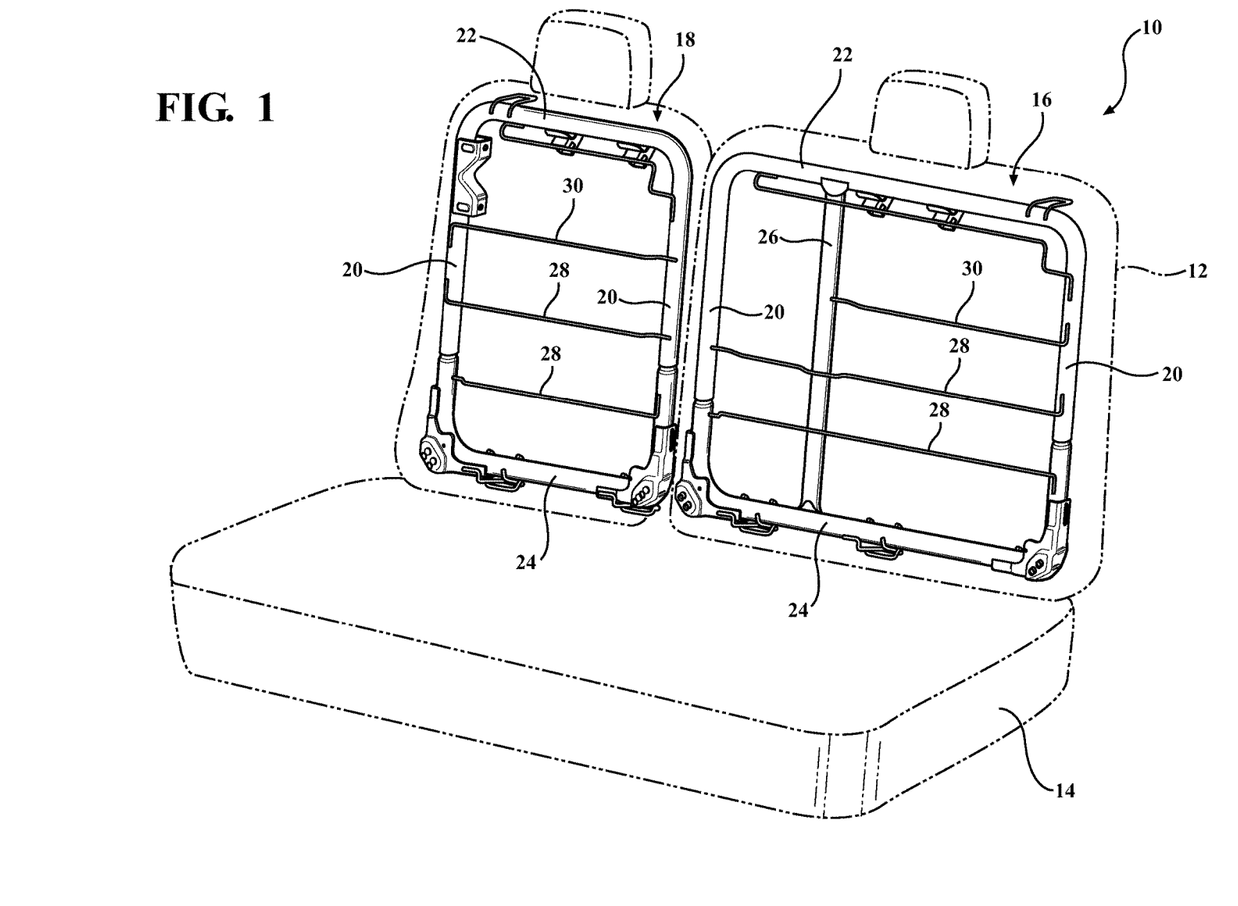
FIG. 1 is a perspective view of a seatback assembly of an automotive vehicle.

With reference to FIG. 1, seat assembly of an automotive vehicle is generally illustrated at 10. The seat assembly 10 includes a seatback 12 and a seat cushion 14. In the illustrated embodiment the seat assembly 10 is a 60/40 rear seat assembly; however, the method for reinforcing a seat frame is not limited to such a seat structure. Specifically, the method for reinforcing a seat frame is optionally provided in a 50/50 seat assembly, captain's or bucket chairs, or is provided in a seat cushion frame for various seat assemblies.

The seatback 12 includes a seatback frame 16 provided in the 60 portion of the seatback 12 and a seatback frame 18 provided in the 40 section of the seatback 12. The seatback frame 16 includes a top frame member 22 and a bottom frame member 24. A pair of side frame members 20 extend from either end of the top frame member 22 and the bottom frame member 24 to form a generally rectangular frame structure. In the illustrated embodiment the top frame member 22 and the bottom frame member 24 and the pair of side frame members 20 are optionally formed as a single unitary one-piece structure; however, the structure of the seatback frame 16 is not limited to such a structure and is optionally provided by securing four separate frame members by welding.

The seatback frame 16 includes a cross frame member 26 extending from the top frame member 22 and the bottom frame member 24 between the pair of side frame members 20. However, the cross frame member 26 is not limited to such a configuration and is optionally provided to extend between the pair of side frame members 20 parallel with the top frame member 22 and the bottom frame member 24.

The seatback frame 18 of the 40% section of the seat assembly 10 is similar in construction to the seatback frame 16 except the seatback frame 18 does not include a cross frame member 26. As such, in an effort for a consolidated explanation, the remaining remarks will be directed toward the seat frame 16.

Figure 2:
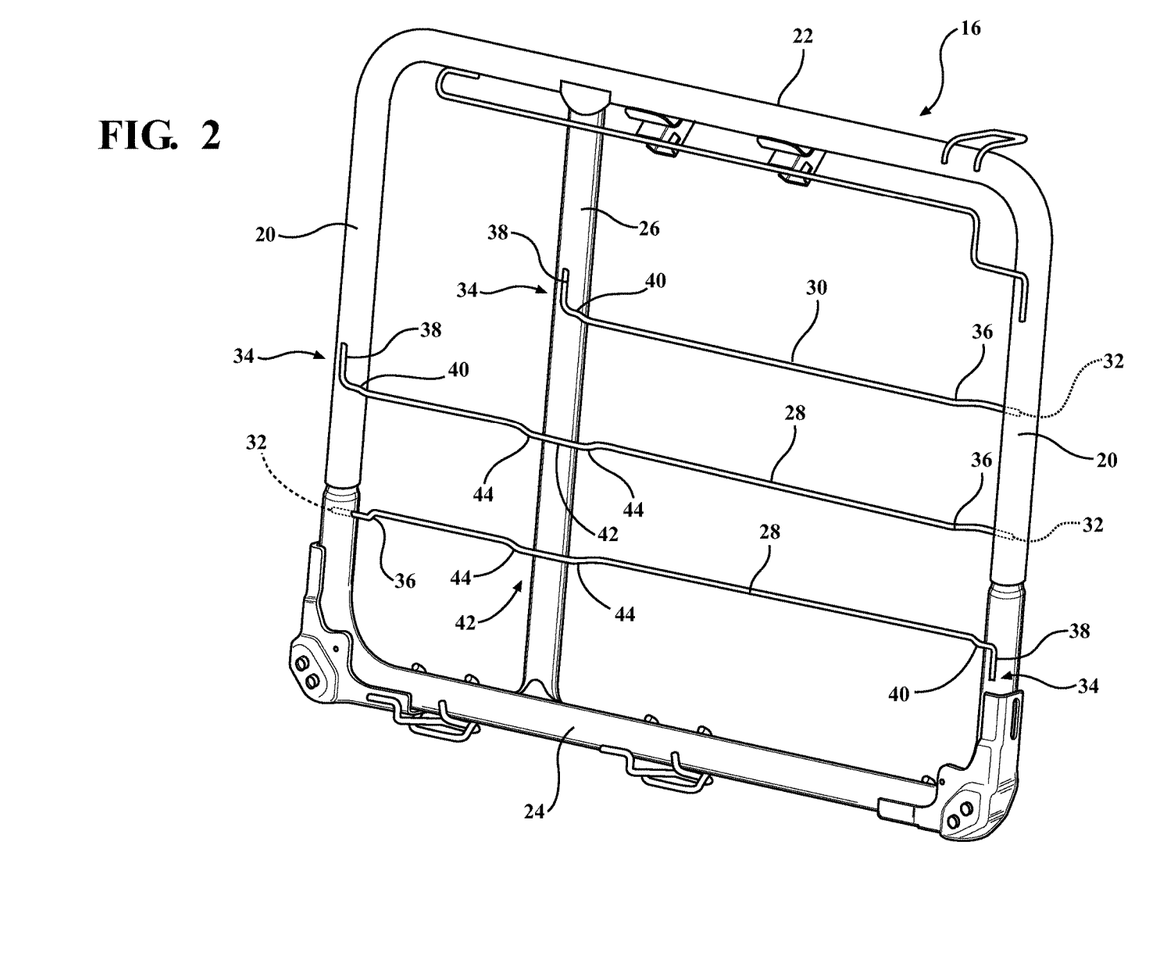
FIG. 2 is a perspective view of a seatback frame.

With reference to FIG. 2, the seatback frame 16 includes a plurality of reinforcement members 28 and 30. The reinforcement members 28 and 30 provide additional structural rigidity to the overall seatback frame 16. In the illustrated embodiment, the reinforcement members 28 and 30 extend between the pair of side frame members 20 and extend parallel to the top frame member 22 and the bottom frame member 24. As will be discussed in greater detail below, the reinforcement members 28 and 30 are secured to the cross frame member 26.

Similarly, the reinforcement member 30 extends from the cross frame member 26 to one of the pair of side frame members 20 and extends parallel to the top frame member 22 and the bottom frame member 24. It is appreciated, of course, that the reinforcement members 28 and 30 are optionally oriented such that the reinforcement members 28 and 30 extend parallel with the side frame members 20 between the top frame member 22 and the bottom frame member 24 in a configuration where the cross member 26 extends parallel with the top frame member 22 and the bottom frame member 24 between the pair of side frame members 20.

The reinforcement members 28 and 30 are formed of an elongated rod which extends along a longitudinal axis L. The reinforcement members 28 and 30 includes an insertion end 32 and an opposite attachment end 34. Adjacent the insertion end 32 is an offset 36 which offsets a portion of the reinforcement member 28 adjacent the insertion end 32. The offset 36 offsets the portion of the reinforcement member 28 adjacent the insertion end 32 in a first direction F1.

The attachment end 34 includes an arm 38 that extends generally normal to the longitudinal axis of the reinforcement member 28. A portion of the reinforcement member 28 adjacent the attachment end 34 including the arm 38 is offset by offset 40 in a second direction. The second direction is opposite the first direction. The arm 38 extends in a direction parallel with one of the pair of side frame members 20 as in the reinforcement member 28 or parallel with the cross frame member 26.

Figures 3A, 3B:
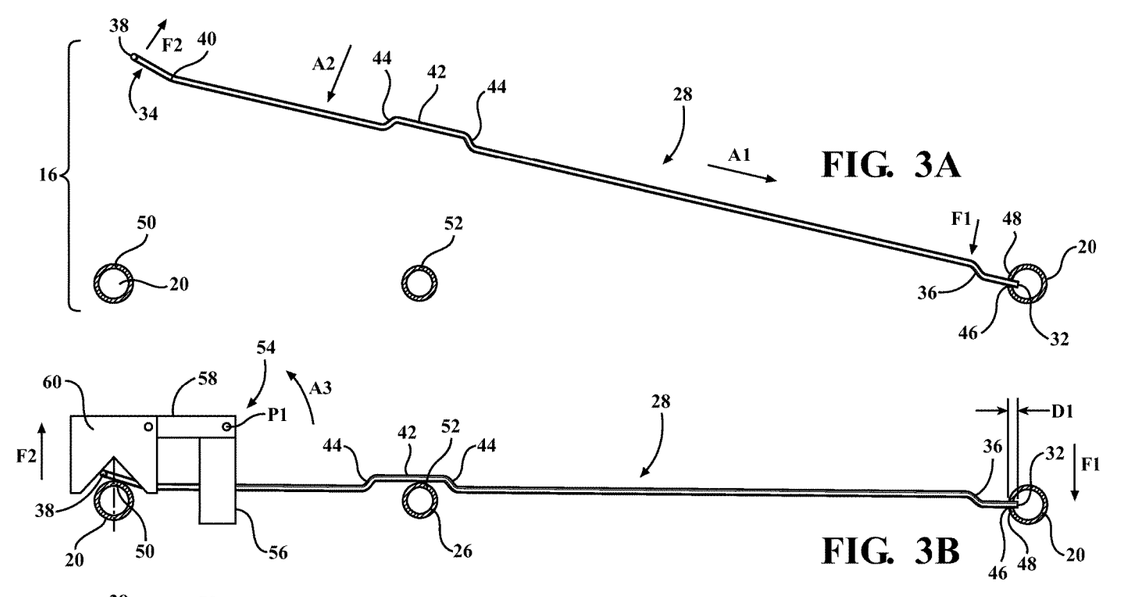
FIG. 3A is a cross sectional view illustrating the insertion of the reinforcement member with the seatback frame.
FIG. 3B is a cross sectional view illustrating the contact between the reinforcement member and the seatback frame.
Figure 3C:
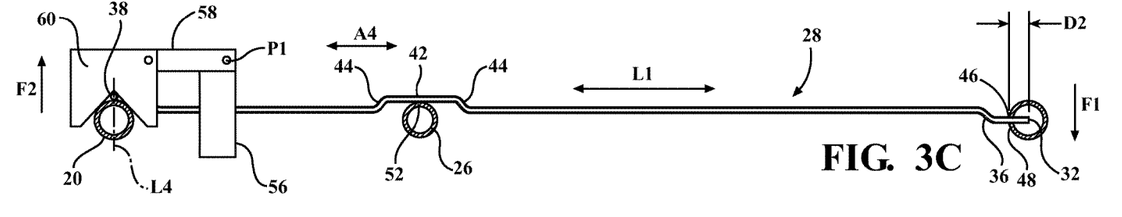
FIG. 3C is a cross-sectional view illustrating the alignment of the reinforcement member with the seatback frame.

The reinforcement member 28 differs from the reinforcement member 30 due to the inclusion of an indented portion 42 formed so as to correspond to the cross frame member 26. The indented portion 42 is formed by a pair of offsets 44 offsetting the indented portion 42 in the second direction F2 which is opposite the first direction F1, as best seen in FIGS. 3A-3C. The indented portion 42 is formed so as to have a width greater than a width of the cross frame member 26 to allow for proper alignment of the reinforcement member 28 due to linear displacement of the reinforcement member 28 as will be discussed in greater detail below. As the reinforcement member 30 extends from the cross member 26 to one of the pair of side frame members 20, an indented portion is omitted.

With reference to FIGS. 3A-3C and 4, discussion on the reinforcement of the seatback frame 16 will be discussed. An aperture 46 is formed in one of the pair of side frame members 20 on an inner surface 48. The inner surface 48 is a surface that faces the other of the pair of side frame members 20.

Initially in the reinforcement of the seatback frame 16, the seatback frame 16 is provided on a workstation jig 80 to maintain the seatback frame 16 in a stationary position so as to allow for later robotic welding. As seen in FIG. 3A, the insertion end 32 of the reinforcement member 28 is inserted into the aperture 46 in the direction of arrow A1. Once the insertion end 32 has been inserted into the aperture 46, the offset 36 allows for the remaining portions of the reinforcement member 28 to contact an outer side face of the seatback frame 16.

The reinforcement member 28 is then manipulated in the direction of arrow A2 so as to provide contact between an outer side surface 50 of the other of the pair of side frame members 20 and the outer side surface 52 of the cross frame member 26. Specifically, the outer side surface 52 of the cross frame member 26 contacts the indented portion 42 and the arm 38 of the attachment end 34 contacts the outer side surface 50 of the other of the pair of side frame members 20. Specifically, the pair of offsets 44 and the offset 40, which offsets the arm 38 and the indented portion 42 in the second direction F2, to allows contact with the outer side surfaces 50 and 52 of reinforcement member 28.

Figure 4:
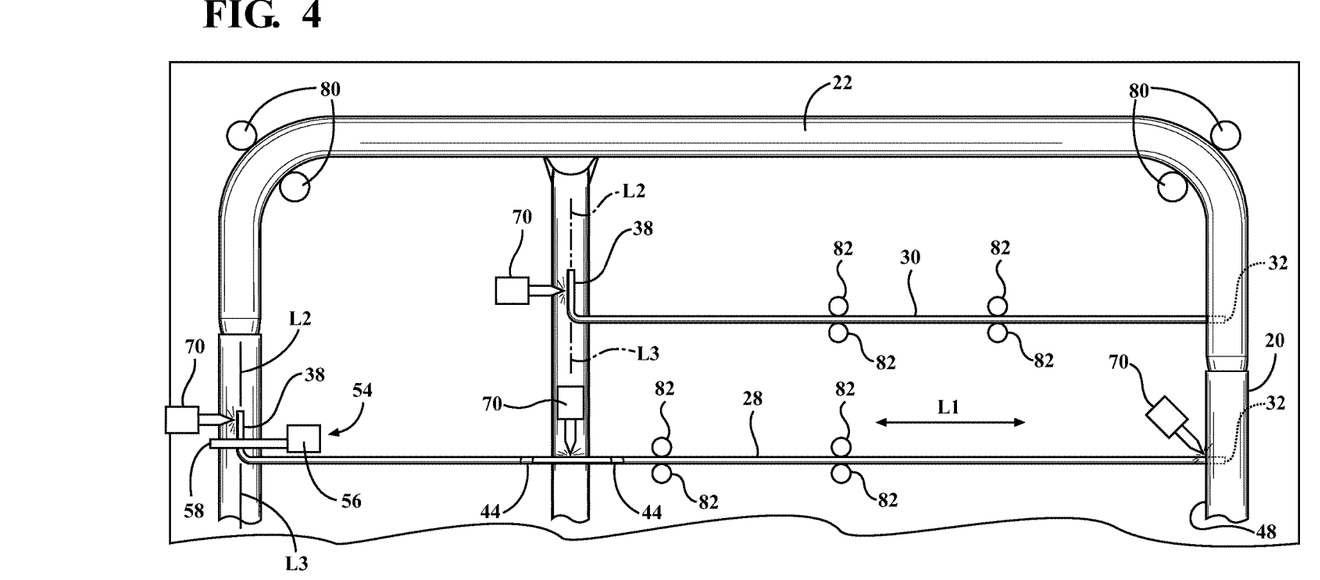
FIG. 4 is a top view illustrating the attachment of the reinforcement member to the seatback frame.

An articulated alignment mechanism 54 includes a post 56 and an extension 58 pivotally connected to the post 56 about pivot axis P1. The extension 58 includes an alignment member 60 pivotally attached about a pivot axis P2. The alignment member 60 includes an inverted V-shaped face. After initial contact is made between the arm 38 and the outer side surface 50 of the side frame member 20 and the outer side surface 52 of the cross frame member 26 with the indented portion 42, the alignment mechanism 54 is actuated such that the extension 58 pivots in the direction of arrow A3 such that the inverted V shape of the alignment member 60 properly aligns the arm 38 with the side frame member 20. As best seen in FIG. 4, the alignment of the arm 38 with the side frame member requires that a longitudinal axis L2 of the arm 38 is aligned parallel with a longitudinal axis L3 of the other of the pair of side frame members 20. Further, the longitudinal axis L2 of the arm 38 and the longitudinal axis of the other of the pair of side frame members 20 are on a vertical axis L4, as shown in FIG. 3C.

Specifically, the arm 38 is centered within the inverted V-shaped of the alignment member 60 to center the arm 38 with respect to the side frame member 20. During the alignment of the arm 38 of the attachment end 34 of the reinforcement member 28, the reinforcement member 28 is linearly displaced along the longitudinal axis L1 of the reinforcement member 28. In the illustrated configuration, the insertion end 32 is moved from a depth D1 from the inner surface 48 of the side frame member 20 to a depth D2, which is larger than depth D1, after the alignment thereof. It is appreciated, of course, that the depth D2 after alignment is optionally smaller than the depth D1 before alignment. However, in either circumstance, the reinforcement member 28 is able to be linearly displaced along the longitudinal axis L1 to properly align the attachment end 34. Specifically, the arm 38 is aligned with the other of the pair of side frame members 20 while maintaining contact of between the one of the pair of side frame members 20 and the opposite insertion end 32. More specifically, a portion of the reinforcement member 28 adjacent the insertion end 32 and the aperture 46 formed in the inner surface 48 of the one of the pair of side frame members 20.

Due to the engagement of the insertion end 32 in the aperture 46 of the one of the pair of side frame members 20, the reinforcement member 28 can be linearly displaced so as to properly align the arm 38 of the attachment end 34 at a center of the outer side surface 50 of the other of the pair of side frame members 20 while maintaining a contact between the insertion end 32 and the other of the side frame members 20. As such, variations in part dimensions and tolerances can be absorbed as the insertion end 32 is capable of being inserted into the side frame member 20 at various depths from the inner surface 48.

As discussed above, the indented portion 42 is provided with a width that is greater than a width of the cross frame member 26 such that during linear displacement of the reinforcement member 28 due to the alignment of the arm 38 of the attachment end 34 contact is maintained between the outer side surface 52 of the cross frame member 26 and the indented portion 42.

As shown in FIG. 4, after the proper alignment of the reinforcement member 28, specifically the alignment of the longitudinal axis L2 of the arm 38 parallel to the longitudinal axis L3 of the other of the pair of side frame members 20, the reinforcement member 28 is fixed to the seatback frame. Specifically, the seatback frame 16, maintained within the jog 80, and the reinforcement member 28, maintained in a jig 82, are welded by robotic welders 70. Specifically, the reinforcement members 28 and 30 are welded at the contact positions between the reinforcement members 28 and 30 with the seatback frame 16.

Figure 5:
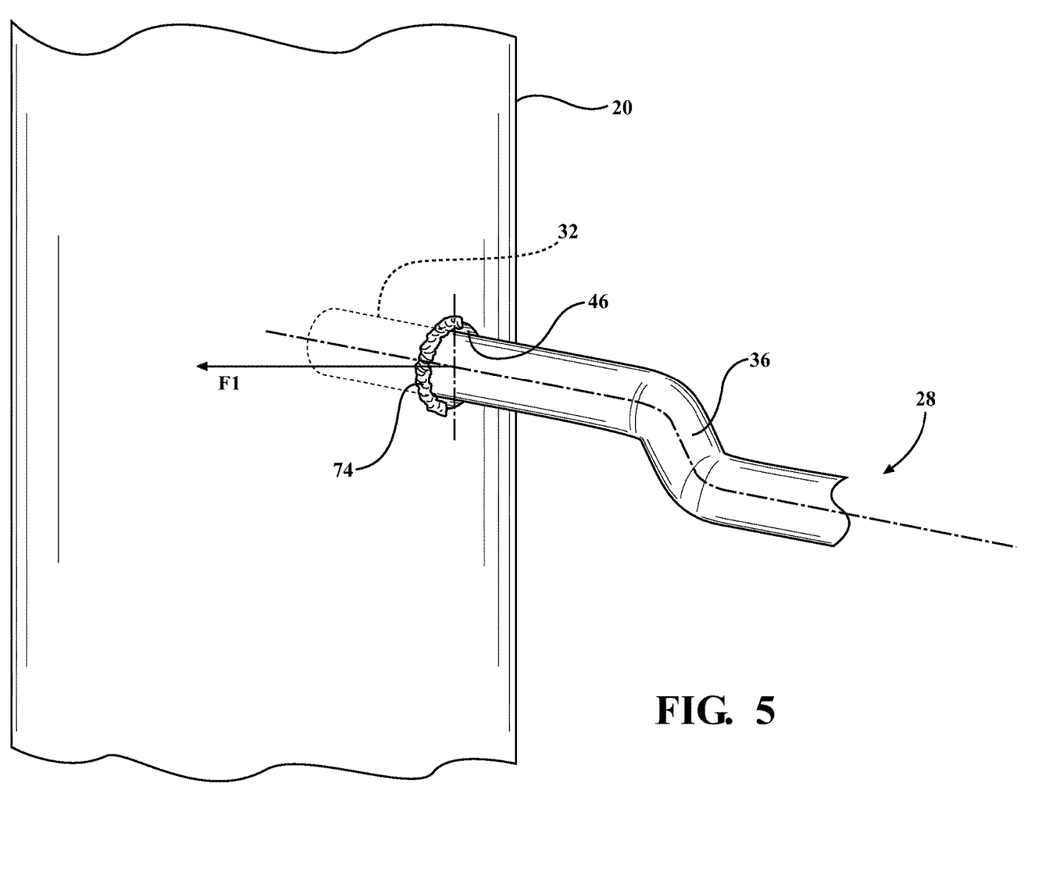
FIG. 5 is a partial perspective view illustrating the securement of the insertion end of the reinforcement member with the seatback frame.

A metal inert gas (MIG) weld is formed on the outer surface of the arm 38 by robotic welders 70. Subsequently, a weld is formed at the interior surface 48 of the one of the pair of side frame members 20 at the engagement of the portion of the reinforcement member 28 adjacent the insertion end 32. Specifically, as shown in FIG. 5, a weld 74 is formed at least 180 degrees about the aperture 46. More particularly, the weld 74 is formed extending 90 degrees from either side of the first direction F1.

Figure 6:
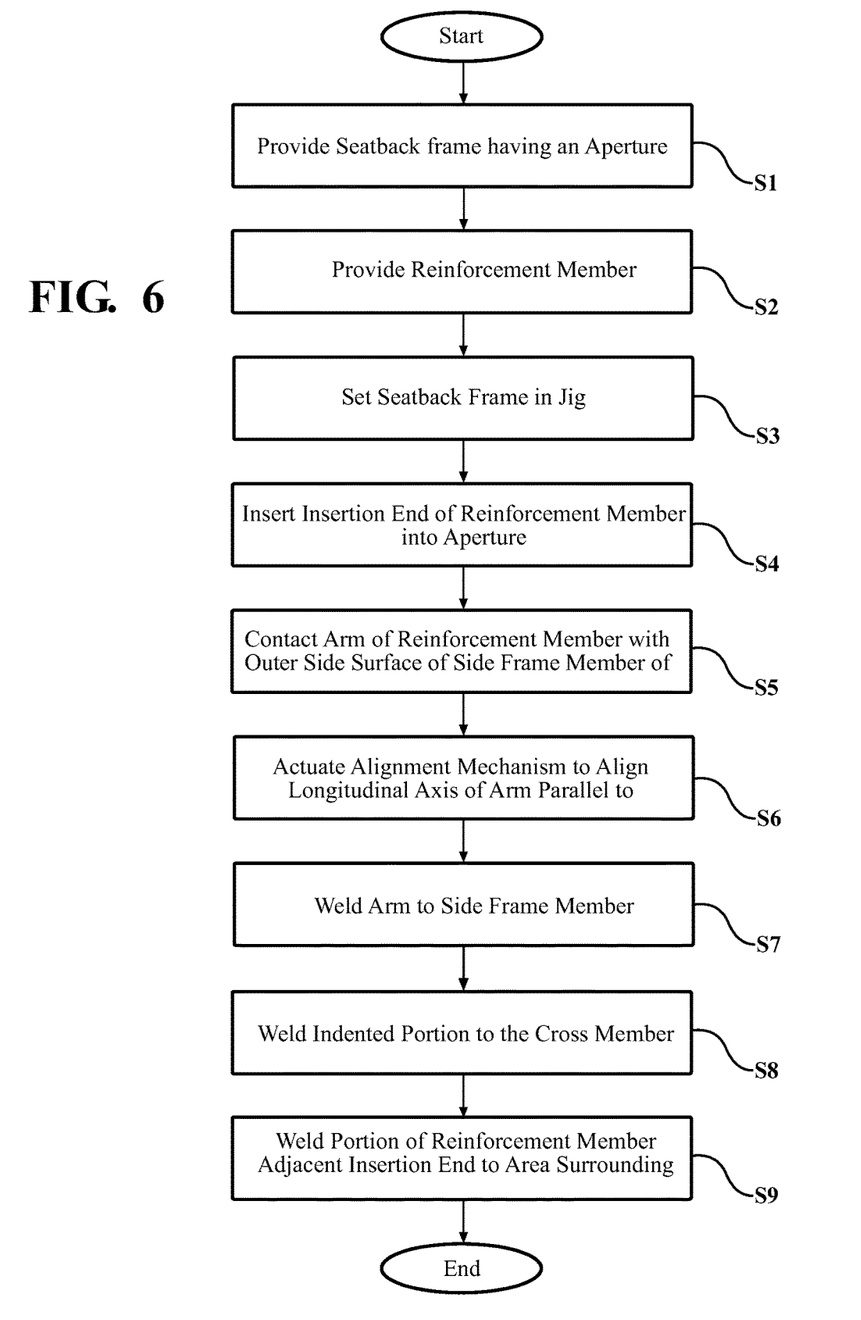
FIG. 6 is a flowchart illustrating the operation of the method of reinforcing a seatback frame.

In order to facilitate a better understanding of the method of reinforcing a seatback frame 16, discussions on the methodology will be made in reference to the flowchart of FIG. 6. Initially, step S1 provides a seatback frame 16 having an aperture 46 provided on the inner surface 48 of one of a pair of side frame members 20. Step S2 provides a reinforcement member 28 with the structure indicated above. Step S3 mounts the seatback frame 16 in a jig 80. Step S4 inserts the insertion end 32 of the reinforcement member 28 into the aperture 46. Step S5 manipulates the reinforcement member 28 to provide contact between the arm 38 and the outer side surface 50 of the other of the pair of side frame members 20 and the indented portion 42 with the outer side surface 52 of the cross member 26. Step S6 articulates the articulation mechanism 54 to align the arm 38 with the other of the pair of side frame members 20. Specifically, aligning the longitudinal axis L2 of the arm 38 so as to be disposed parallel with the longitudinal axis L3 of the other of pair of side frame members 20 at a centered position on the outer side surface 50.

Step S7 welds the arm 38 to the outer side surface 50 of the other of the pair of side frame members 20. Subsequent to step S7 the indented portion 42 is welded to the outer side surface 52 of the cross member 26 at step S8. Step S9 welds the contact point between the engagement of the portion of the reinforcement member 28 adjacent the insertion end 32 with the interior surface 48 surrounding the aperture 46. The step S7 is preformed prior to the steps S8 and S9, so as to rigidly connect the arm 38 to the outer side surface 50 to maintain the alignment of the reinforcement member 28 before the indented portion 42 and the insertion end 32 are welded to the seatback frame 16.

It is appreciated, of course, that the method of reinforcing a seatback frame is not limited to reinforcing a frame limited to a seatback assembly and is operable to reinforce a frame for various structures. Moreover, as the above description identifies the use of a robotic weld 72, the methodology is not limited to the use of robotic welders and illustratively includes manual welds.

From the foregoing, it can be seen that the present invention provides a method of reinforcing a seat frame which maintains continued contact between the portion of the reinforcement member adjacent an insertion end with a side frame member while an opposite end having an arm is aligned including a linear displacement of the reinforcement member along the longitudinal axis of the reinforcement member. Having described the invention, however, many modifications thereto will become apparent to those skilled in the art to which it pertains without deviation from the spirit of the invention as defined by the scope of the appended claims.

It is claimed:

1. A method of reinforcing a frame of a seat assembly, the frame having a pair of first frame members, the pair of first frame members being spaced apart and parallel, said method comprising:
   providing a reinforcement member having an insertion end, an end opposite the insertion end, and an arm that extends from the end opposite the insertion end of the reinforcement member, a portion of the reinforcement member adjacent the insertion end extends in an insertion direction, a longitudinal axis of the arm extends generally normal to a longitudinal axis of the reinforcement member to define a general L-shape, the longitudinal axis of the arm extends generally normal to the insertion direction;
   forming an aperture in one of the pair of first frame members;
   inserting the insertion end of the reinforcement member into the aperture;
   aligning the longitudinal axis of the arm parallel to a center axis of the other of the pair of first frame members while maintaining the insertion end within the aperture; and
   welding the reinforcement member to the frame.

2. The method according to claim 1, wherein the reinforcement member is an elongated rod.

3. The method according to claim 1, wherein the portion of the reinforcement member adjacent the insertion end is offset with respect to the longitudinal axis of the reinforcement member in a first direction.

4. The method according to claim 1, wherein the aperture is formed on an inner surface of the one of the pair of first frame members.

5. The method according to claim 1, wherein alignment of the arm with the other of the pair of first frame members includes a linear adjustment of the reinforcement member along a longitudinal axis of the reinforcement member, the insertion of the insertion end of the reinforcement member within the aperture allows for the linear adjustment of the reinforcement member along the longitudinal axis of the reinforcement member while maintaining contact between the reinforcement member and the one of the pair of first frame members.

6. The method according to claim 3, wherein a portion of the reinforcement member adjacent the arm is offset with respect to the longitudinal axis of the reinforcement member in a second direction, the second direction opposite the first direction.

7. The method according to claim 1, wherein the insertion end is welded to the aperture of the one of the pair of first frame members before the arm is welded to the other of the pair of first frame members.

8. The method according to claim 6, wherein the frame includes a pair of second frame members and a cross frame member traversing the pair of second frame members, the cross frame member extends between and parallel with the pair of first frame members to contact a portion of the reinforcement member.

9. The method according to claim 8, wherein the cross frame member contacts the reinforcement member between the insertion end and the arm.

10. The method according to claim 9, wherein the reinforcement member includes an indented portion that is offset with respect to the longitudinal axis of the reinforcement member in the second direction, the indented portion has a width greater than a width of the cross frame member to allow for a linear adjustment of the reinforcement member along the longitudinal axis of the reinforcement member during the aligning of the arm with the other of the pair of first frame members.

11. A method of reinforcing a frame having a pair of first frame members, said method comprising:
    providing an elongated rod having an insertion end and an arm adjacent an end opposite the insertion end, the arm extends generally normal to a longitudinal axis of the elongated rod to define a general L-shape;
    forming an aperture in one of the pair of first frame members;
    inserting the insertion end of the elongated rod into the aperture;
    aligning a longitudinal axis of the arm parallel to a center axis of the other of the pair of first frame members while maintaining the insertion end within the aperture; and
    welding the elongated rod to the frame,
    wherein the frame includes a pair of second frame members and a cross frame member traversing the pair of second frame members, the cross frame member extends between and parallel with the pair of first frame members to contact a portion of the elongated rod, and
    wherein the elongated rod includes an indented portion that is offset with respect to the longitudinal axis of the elongated rod in an indented direction, the indented portion has a width greater than a width of the cross frame member to allow for a linear adjustment of the elongated rod along the longitudinal axis of the elongated rod during the aligning of the arm with the other of the pair of first frame members.

12. The method according to claim 11, wherein the center axis of the other of the pair of first frame members is a longitudinal axis of the other of the pair of first frame members.

13. The method according to claim 11, wherein the aperture is formed on an inner surface of the one of the pair of first frame members.

14. The method according to claim 11, wherein alignment of the arm with the other of the pair of first frame members includes a linear adjustment of the elongated rod along a longitudinal axis of the elongated rod, the insertion of the insertion end of the elongated rod within the aperture allows for the linear adjustment of the elongated rod along the longitudinal axis of the elongated rod while maintaining contact between the elongated rod and the one of the pair of first frame members.

15. A method of reinforcing a frame of a seat assembly, the frame having a pair of first frame members, said method comprising:
    inserting an insertion end of a reinforcement member into an aperture formed in one of the pair of first frame members, a portion of the reinforcement member adjacent the insertion end extends in an insertion direction;
    aligning a longitudinal axis of an arm of the reinforcement member parallel to a longitudinal axis of the other of the pair of first frame members while maintaining the insertion end within the aperture, the arm extends generally normal to a remainder of the reinforcement member to define a generally L-shape, the arm opposite the insertion end of the reinforcement member, the longitudinal direction of the arm extends generally normal to the insertion direction; and
    welding the reinforcement member to the frame,
    wherein the frame includes a pair of second frame members and a cross frame member traversing the pair of second frame members, the cross frame member extends between and parallel with the pair of first frame members to contact a portion of the reinforcement member, and
    wherein the reinforcement member includes an indented portion that is offset with respect to a longitudinal axis of the reinforcement member in a second direction, the indented portion has a width greater than a width of the cross frame member to allow for a linear adjustment of the reinforcement member along the longitudinal axis of the reinforcement member during the aligning of the arm with the other of the pair of first frame members.

16. The method according to claim 15, wherein the portion of the reinforcement member adjacent the insertion end is offset with respect to a longitudinal axis of the reinforcement member in a first direction.

17. The method according to claim 16, wherein a portion of the reinforcement member adjacent the arm is offset with respect to the longitudinal axis of the reinforcement member in a direction opposite the first direction.

18. The method according to claim 15, wherein alignment of the arm with the other of the pair of first frame members includes a linear adjustment of the reinforcement member along the longitudinal axis of the reinforcement member, the insertion of the insertion end of the reinforcement member within the aperture allows for the linear adjustment of the reinforcement member along the longitudinal axis of the reinforcement member while maintaining contact between the reinforcement member and the one of the pair of first frame members.

* * * * *